US007890216B2

(12) United States Patent
Boger et al.

(10) Patent No.: US 7,890,216 B2
(45) Date of Patent: *Feb. 15, 2011

(54) CONTROL VALVE AND POSITIONER DIAGNOSTICS

(75) Inventors: Henry W. Boger, Foxboro, MA (US); Sandro Esposito, Bridgewater, MA (US)

(73) Assignee: Dresser, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/437,443

(22) Filed: May 7, 2009

(65) Prior Publication Data

US 2009/0216350 A1    Aug. 27, 2009

Related U.S. Application Data

(63) Continuation of application No. 11/620,584, filed on Jan. 5, 2007, now Pat. No. 7,539,560.

(51) Int. Cl.
| | |
|---|---|
| G05D 7/00 | (2006.01) |
| G06F 19/00 | (2006.01) |
| G01F 1/00 | (2006.01) |
| G01F 7/00 | (2006.01) |
| F17D 3/00 | (2006.01) |
| G05F 5/00 | (2006.01) |
| G05F 3/00 | (2006.01) |
| F04B 49/00 | (2006.01) |
| F16K 3/12 | (2006.01) |

(52) U.S. Cl. .................... 700/282; 702/47; 73/1.35; 137/12; 137/14; 137/487.5; 323/234; 323/299; 323/304; 417/26; 417/63; 417/279

(58) Field of Classification Search .............. 700/282; 702/45, 47; 73/1.16, 1.34, 1.35; 137/2, 12, 137/14, 38, 803–805, 825, 826; 323/234, 323/299, 304; 417/1, 26, 63, 278, 279

See application file for complete search history.

(56) References Cited

U.S. PATENT DOCUMENTS 4,029,122 A    6/1977    Jaegtnes (Continued)

FOREIGN PATENT DOCUMENTS

DE    39 11 259    10/1990

(Continued)

OTHER PUBLICATIONS

Fisher Bulletin 62.1:VL1000: DVC5000, DVC5000(S1); DT4000; Jun. 1994, pp. 1-26.

(Continued)

*Primary Examiner*—Crystal J Barnes-Bullock
(74) *Attorney, Agent, or Firm*—Fish & Richardson P.C.

(57) ABSTRACT

Valve positioning systems may include one or more components and a controller. Components may include one or more electric-to-pressure output converters, relays, gas supplies, and/or actuators. A controller may adjust a position of a valve by sending a signal. The valve positioning system may individually monitor components and determine the condition of each component being individually monitored. The valve positioning system may determine if a component will fail prior to failure and/or determine if a problem will occur in a component prior to the problem occurring.

22 Claims, 8 Drawing Sheets

U.S. PATENT DOCUMENTS

| | | | |
|---|---|---|---|
| 4,263,997 A | | 4/1981 | Poore |
| 4,274,438 A | | 6/1981 | La Coste |
| 4,334,216 A | * | 6/1982 | Lacroix ..................... 340/679 |
| 4,481,451 A | | 11/1984 | Kautz et al. |
| 4,509,403 A | | 4/1985 | Gassman et al. |
| 4,523,286 A | | 6/1985 | Koga et al. |
| 4,542,649 A | | 9/1985 | Charbonneau et al. |
| 4,556,956 A | | 12/1985 | Dickenson et al. |
| 4,690,003 A | | 9/1987 | McNennamy et al. |
| 4,693,113 A | | 9/1987 | McNennamy et al. |
| 4,712,173 A | | 12/1987 | Fujiwara et al. |
| 4,722,372 A | * | 2/1988 | Hoffman et al. ............. 141/98 |
| 4,831,873 A | | 5/1989 | Charbonneau et al. |
| 4,856,327 A | | 8/1989 | Branam et al. |
| 4,860,596 A | | 8/1989 | Charbonneau et al. |
| 4,896,101 A | | 1/1990 | Cobb |
| 4,976,144 A | | 12/1990 | Fitzgerald |
| 5,024,417 A | | 6/1991 | Voxbrunner |
| 5,049,764 A | | 9/1991 | Meyer |
| 5,070,846 A | | 12/1991 | Dudek et al. |
| 5,072,748 A | * | 12/1991 | Gripe et al. ................. 137/102 |
| 5,109,692 A | | 5/1992 | Fitzgerald |
| 5,197,328 A | | 3/1993 | Fitzgerald |
| 5,249,954 A | | 10/1993 | Allen et al. |
| 5,251,148 A | | 10/1993 | Haines et al. |
| 5,272,647 A | | 12/1993 | Hayes |
| 5,329,465 A | | 7/1994 | Arcella et al. |
| 5,425,270 A | | 6/1995 | McDonald et al. |
| 5,431,182 A | | 7/1995 | Brown |
| 5,469,737 A | | 11/1995 | Smith et al. |
| 5,524,484 A | | 6/1996 | Sullivan |
| 5,526,690 A | | 6/1996 | Louie et al. |
| 5,533,544 A | | 7/1996 | Good et al. |
| 5,543,696 A | | 8/1996 | Huggett et al. |
| 5,549,137 A | | 8/1996 | Lenz et al. |
| 5,573,032 A | | 11/1996 | Lenz et al. |
| 5,594,175 A | | 1/1997 | Lyon et al. |
| 5,616,824 A | | 4/1997 | Abdel-Malek et al. |
| 5,654,885 A | | 8/1997 | Mayhew et al. |
| 5,684,451 A | | 11/1997 | Seberger et al. |
| 5,687,098 A | | 11/1997 | Grumstrup et al. |
| 5,715,178 A | | 2/1998 | Scarola et al. |
| 5,748,469 A | | 5/1998 | Pyotsia |
| 5,847,952 A | | 12/1998 | Samad |
| 5,872,763 A | | 2/1999 | Osakabe |
| 5,878,765 A | | 3/1999 | Lange |
| 5,884,894 A | | 3/1999 | Smith |
| 5,892,690 A | | 4/1999 | Boatman et al. |
| 5,897,601 A | * | 4/1999 | Suzuki ........................ 701/78 |
| 5,966,679 A | | 10/1999 | Snowbarger et al. |
| 5,970,430 A | | 10/1999 | Burns et al. |
| 5,992,229 A | | 11/1999 | Pyotsia et al. |
| 6,016,875 A | | 1/2000 | Orbach et al. |
| 6,026,352 A | | 2/2000 | Burns et al. |
| 6,035,878 A | | 3/2000 | Adams et al. |
| 6,049,764 A | | 4/2000 | Stahl |
| 6,155,283 A | | 12/2000 | Hansen et al. |
| 6,176,247 B1 | | 1/2001 | Winchcomb et al. |
| 6,186,167 B1 | | 2/2001 | Grumstrup et al. |
| 6,192,321 B1 | | 2/2001 | Grumstrup et al. |
| 6,272,401 B1 | | 8/2001 | Boger et al. |
| 6,382,226 B1 | | 5/2002 | Larson et al. |
| 6,453,261 B2 | | 9/2002 | Boger et al. |
| 6,466,893 B1 | | 10/2002 | Latwesen et al. |
| 6,505,145 B1 | | 1/2003 | Bjornson |
| 6,678,584 B2 | | 1/2004 | Junk et al. |
| 6,745,084 B2 | | 6/2004 | Boger et al. |
| 6,804,618 B2 | | 10/2004 | Junk |
| 6,862,547 B2 | | 3/2005 | Snowbarger et al. |
| 6,954,683 B2 | | 10/2005 | Junk et al. |
| 7,039,537 B2 | | 5/2006 | Junk |
| 7,079,021 B2 | | 7/2006 | Snowbarger et al. |
| 7,085,610 B2 | | 8/2006 | Eryurek et al. |
| 7,089,086 B2 | | 8/2006 | Schoonover |
| 7,114,698 B2 | * | 10/2006 | Espinoza ..................... 251/93 |
| 7,283,894 B2 | | 10/2007 | Esposito et al. |
| 7,661,439 B2 | * | 2/2010 | Chester et al. ........... 137/487.5 |
| 2001/0032518 A1 | | 10/2001 | Boger et al. |
| 2001/0037159 A1 | | 11/2001 | Boger et al. |
| 2001/0037670 A1 | | 11/2001 | Boger et al. |
| 2002/0038156 A1 | | 3/2002 | Eryurek et al. |
| 2002/0040284 A1 | | 4/2002 | Junk |
| 2002/0052712 A1 | | 5/2002 | Voser et al. |
| 2003/0144747 A1 | | 7/2003 | Shakespeare |
| 2004/0039488 A1 | | 2/2004 | Junk et al. |
| 2006/0219299 A1 | | 10/2006 | Snowbarger |
| 2006/0220844 A1 | | 10/2006 | Flanders |

FOREIGN PATENT DOCUMENTS

| | | | |
|---|---|---|---|
| DE | 39 11 259 A1 | | 10/1990 |
| DE | 195 40 441 | | 4/1997 |
| DE | 195 40 441 A1 | | 4/1997 |
| EP | 0 571 080 | | 11/1993 |
| EP | 0 571 080 A | | 11/1993 |
| EP | 0 591 925 A | | 4/1994 |
| EP | 0 660 017 | | 6/1995 |
| EP | 0 660 017 A | | 6/1995 |
| EP | 0864949 | | 9/1998 |
| EP | 1070893 | | 1/2001 |
| EP | 1 417 552 | | 12/2005 |
| JP | 05296201 | | 11/1993 |
| JP | 05296201 A | * | 11/1993 |
| JP | 09-49502 | | 2/1997 |
| JP | 09-120303 | | 5/1997 |
| JP | 08018329 | | 7/1997 |
| JP | 09189370 | | 7/1997 |
| JP | 10064064 | | 3/1998 |
| JP | 10336238 | | 12/1998 |
| WO | WO 00/52374 | | 9/2000 |
| WO | WO 01/11436 | | 2/2001 |
| WO | WO 02/05199 | | 1/2002 |
| WO | WO 2005/109140 A1 | | 11/2005 |

OTHER PUBLICATIONS

Fisher Bulletin 62.1:DT4000(S1); Sep. 1994, pp. 1-8.
Fisher Bulletin 62.1:DT4000; Dec. 1995, pp. 1-12.
Foxboro/Eckardt SRD991 Product Information. Oct. 1995, pp. 1-2.
Hartmann & Braun, Intelligent Positioner TZID—Product Information, published at least before filing date of application, pp. 1-2.
Honeywell, Series EP2300 Electro-pneumatic positioner—Product Information, published at least before filing date of application, pp. 1-4.
Moore, ValvePAC Intelligent Valve Control—Product Information, published at least before filing date of application, pp. 1-5.
Neles-Jamesbury, The ND800 Valve Controller—Product Information, published at least before filing date of application, pp. 1-4.
Samson, Product Information, published at least before filing date of application, pp. 1-23.
Siemens, SIPART PS—Product Information, published at least before filing date of application, pp. 1-6.
Valtek, Logix/StarPac/StarPacII—Product Information, published at least before filing date of application, pp. 1-17.
IcoT—Smart Positioner Product Information, published at least before filing date of application, pp. 1-17.
Worcester Controls, Pulsair—Product Information, published at least before filing date of application, pp. 1-25.
Yokogawa, ValveManager—Product Information, published at least before filing date of application, pp. 1-25.
IEEE Press, The Authoritative Dictionary of IEEE Standards Terms 2000, Standards Information Network IEEE Press, 7$^{th}$ edition, Dec. 2000, p. 422.
European Patent Office, European Search Report for Application No. EP 03 40 0057 dated Feb. 4, 2005 (3 pages).

European Patent Office, European Search Report for Application No. 98 93 4660 dated Dec. 18, 2001 (4 pages).
WIPO, International Search Report for PCT/US98/14978 dated Jul. 20, 1998 (4 pages).
European Patent Office, European Search Report for Application No. EP 04 01 0177 dated Jul. 15, 2004 (3 pages).
European Patent Office, European Search Report for Application No. EP 04 01 0179 dated Apr. 8, 2005 (3 pages).
European Patent Office, European Search Report for Application No. EP 04 01 0178 dated Apr. 8, 2005 (3 pages).
PCT International Search Report, PCT/US04/04039, Jul. 6, 2005, pp. 1-2.
"Non-Invasive Diagnostics of Motor-Operated Valves", Jangobom Chai, Ajou University, Proceedings of the American Control Conference, Jun. 1994, pp. 2006-2012.
Notification of Transmittal of the International Search Report and the Written Opinion of the International Searching Authority, or the Declaration (2 pages), International Search Report (4 pages), and Written Opinion of the International Searching Authority (7 pages) for International Application No. PCT/US2007/089091 mailed Jun. 2, 2008.
European Patent Office, European Search Report for Application No. EP 03 40 0057, Feb. 4, 2005, 3 pages.
European Patent Office, European Search Report for Application No. 98 93 4660, Dec. 18, 2001, 4 pages.
European Patent Office, European Search Report for Application No. EP 04 01 0177, Jul. 15, 2004, 3 pages.
European Patent Office, European Search Report for Application No. EP 04 01 0179, Apr. 8, 2005, 3 pages.
European Patent Office, European Search Report for Application No. EP 04 01 0178, Apr. 8, 2005, 3 pages.
Fisher Bulletin 62.1:DT4000(S1), Sep. 1994, 8 pages.
Fisher Bulletin 62.1:DT4000, Dec. 1995, 12 pages.
Fisher Bulletin 62.1:VL1000: DVC5000, DVC5000(S1); DT4000, Jun. 1994, 26 pages.
Foxboro/Eckardt, SRD991 Product Information, Oct. 1995, 2 pages.
Hartmann & Braun, Intelligent Positioner TZID—Product Information, published at least before filing date of application, 2 pages.
Honeywell, Series EP2300 Electro-pneumatic positioner—Product Information, published at least before filing date of application, 4 pages.
IcoT—Smart Positioner Product Information, published at least before filing date of application, 16 pages.
IEEE Press, The Authoritative Dictionary of IEEE Standards Terms 2000, Standards Information Network IEEE Press, 7$^{th}$ edition, Dec. 2000, 3 pages.
Moore, ValvePAC Intelligent Valve Control—Product Information, published at least before filing date of application, 5 pages.
Neles-Jamesbury, The ND800 Valve Controller—Product Information, published at least before filing date of application, 4 pages.
PCT International Search Report, PCT/US04/04039, Jul. 6, 2005, 2 pages.
Samson, Product Information, published at least before filing date of application, 23 pages.
Siemens, SIPART PS—Product Information, published at least before filing date of application, 6 pages.
Valtek, Logix/StarPac/StarPacII—Product Information, published at least before filing date of application, 17 pages.
PCT Notification of Transmittal of the International Search Report, PCT/US98/14978, Jul. 9, 1999, 4 pages.
Worcester Controls, Pulsair—Product Information, published at least before filing date of application, 25 pages.
Yokogawa, ValveManager—Product Information, published at least before filing date of application, 25 pages.
"*Making Valve Controllers/Positioners Smart is Smart Business*", Harold, Dave, From the pages of Control Engineering, Jan. 1, 2003 [retrieved on Dec. 20, 2006], Retrieved from http://www.controleng.com/index.asp?layout=articlePrint&articleid=CA269795; or http://www.manufacturing.net.ctl/article/CA269795.htm , 5 pages.
"*Digitally Mastered*", Reprint from Control and Instrumentation, Nov. 2004 [retrieved on Dec. 20, 2006], Retrieved from http://www.documentation.emersonprocess.com/groups/public/documents/articles_articlesreprints/d350813x012.pdf#search=%22ESD%20trip%20signature%22, 2 pages.
"*Process Safety What are the Odds?*", Harold, Dave, From the pages of Control Engineering, Apr. 1, 2005 [retrieved on Dec. 20, 2006], Retrieved from http://www.controleng.com/index.asp?layout=articlePrint&articleID=CA515956 or http://www.manufacturing.net/ctl/index.asp?layout=articlePrint&articleID=CA515956, 4 pages.
PCT Nofification of Transmittal of International Preliminary Examination Report, PDT/US98/14978, Feb. 3, 2000, 4 pages.
European Patent Office, Supplementary European Search Report for Application No. EP 04 71 0617.4, 3 pages.
PCT Notification Concerning Transmittal of Copy of International Preliminary Report on Patentability, PCT/US2004/004039, Sep. 1, 2005, 5 pages.
PCT Written Opinion of the International Searching Authority, PCT/US04/04039, Jul. 6, 2005, 3 pages.
International Search Report and Written Opinion for PCT/US2007/061875 dated Jul. 2, 2008, 12 pages.

* cited by examiner

CONTROL VALVE AND POSITIONER DIAGNOSTICS

RELATED APPLICATIONS

This application is a continuation of U.S. patent application Ser. No. 11/620,584, filed on Jan. 1, 2007, and claims the benefit thereof under 35 U.S.C. §120.

TECHNICAL FIELD

This invention relates to valve positioning systems and methods performed by valve positioning systems, and more particularly to self-diagnosing valve positioning systems.

BACKGROUND

Control valves are used to regulate fluid flow in a wide variety of commercial and industrial systems. Today, many control valves include and/or are controlled by automated positioners, which may have the ability to adjust the valve to control fluid flow for a process. Some positioners may even be able to self-calibrate. Down-time incurred to repair and/or replace control valves and/or positioners and/or loss of product from the process due to the low quality produced while a control valve and/or positioner are malfunctioning may increase production costs and decrease efficiencies for the process.

While detection of a problem in a fluid control system may be identified when the quality of a process deteriorates, the source of the problem in the system may not be identifiable in this manner. Fluid control systems include numerous components that can have problems such as failure, leaking, breaking, and/or operating irregularly, such as limit cycles. Problems with systems are typically only detected once a problem occurs. However, once a problem occurs, a process may have already been adversely affected by the problem. Furthermore, some systems may require the control valve to be brought off line for diagnosis, which can interrupt the process. Other systems may allow on-line detection, but may only detect problems after failure or when the system is operating irregularly, which may still harm the process.

SUMMARY

A valve positioning system may include a number of components and a controller. In one implementation, the components and the controller may be positioned in a housing. At least one of the components of the valve positioning system may include an electric-to-pressure output converter. Components may also include relays, gas supplies, and/or actuators.

A controller may individually monitor components of the valve positioning system and determine the condition of components being monitored. Determining the condition of a component may include determining if the component will fail prior to the component failing and/or determining if there will be a problem with the component prior to the problem occurring.

A valve positioning system may include sensors coupled to the inlet and the outlet of a component. A sensor may transmit a signal being measured to the controller. The controller may compare signals from an inlet and an outlet of a component. In one implementation, a signal for the inlet for a component may be the signal for the outlet of another component.

In some implementations, the valve positioning system may individually monitor at least one component, such as an electric-to-pressure output converter and/or an actuator. The valve positioning system may determine the condition of each component being monitored. The valve positioning system may determine if a component is failing or will fail at least partially based on the determination of the condition of a component. The system may determine if a problem will occur prior to the problem occurring in a component at least partially based on the determination of the condition of a component. In some implementations, the valve positioning system may compare signals from the inlets and the outlet of each component being individually monitored and determine the condition of a component based at least partially on the comparison.

In particular implementations, a valve positioning system may adjust an input signal into at least one system component such that a valve actuator is inhibited from responding to the input signal change. Adjusting the input signal may include terminating the input signal and/or transmitting a high frequency signal. The valve positioning system may determine input and output signals at one or more of the components. One or more sensors may determine input and/or output signals. The valve positioning system may determine a condition of a component based at least partially on the comparison of input and output signals of the component. In some implementations, the valve positioning system may determine if one of the components will fail prior to failure of the component and/or determine if there will be a problem with one of the components prior to the problem occurring at least partially based on the determination of the condition of a component.

Various implementations may have one or more features. For example, one feature of a valve positioning system may be the ability to monitor while the valve is operating. Allowing on-line monitoring may reduce operating costs since downtime may be reduced and/or redundant valve positioning systems may not be needed. Another feature may include the capability to detect problems with a component prior to failure. The ability to detect problems prior to failure may reduce downtime and/or decrease the effect of the failure on the valve positioning system (e.g., earlier detection of a problem in a component of the valve positions system may result in less product being adversely affected by inaccurate positioning of a valve). A feature of the valve positioning system may include isolation of a problem with and/or failure of a component in the system, which may decrease downtime and/or allow more efficient replacement and/or repair of components.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

A valve positioning system may include a controller and various other components. The controller may control a position of a valve and monitor components of a valve and/or the valve positioning system. For example, the controller may adjust a position of a valve in response to an input signal (e.g., a signal from a remote process controller and/or an operator). The controller may also analyze signals from the monitored components to determine a condition of a valve and/or a valve positioning system and/or components of the valve positioning system.

Components of a valve positioning system may include converters, sensors, relays, gas supply lines, fluid supply lines, and/or actuators. Converters may convert a signal received from a controller. For example, an electric-to-pressure output converter ("E/P converter") may convert an electrical signal from a controller to a signal that is a flow of a fluid or gas, such as air, natural gas, or other appropriate compressible gasses. Sensors may be any device capable of measuring a signal (e.g., electrical or pressure) produced and/or received by the valve positioning system. For example, a sensor may measure parameters such as, but not limited to, pressure, flow rate, electrical current, electrical voltage, and/or a valve position. Relays may transmit and/or amplify signals received. Relays may include, but are not limited to, a spring-diaphragm actuator, a spool valve, or a pneumatic amplifier. An actuator may respond to the signal from the converter. An actuator, may for example, include a piston subject to differential pressure.

A valve positioning system may be self-diagnosing. For example, the valve positioning system may be capable of determining the condition of various components of the system. Utilizing self-diagnosis in a valve positioning system may allow quicker detection/identification of component failures in the valve positioning system and/or problems with components prior to failures or problems arising. Problems may include, but are not limited to, mechanical problems and/or failures with portions of a component (e.g., valves, lines, connections, and regulators), problems and/or failures with electrical components of the controller, shift in electronics such as software problems or problems with filters applied in the electronics.

Figure 1:
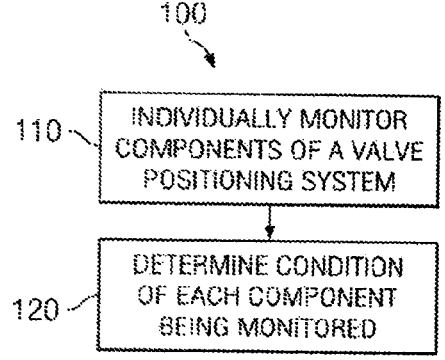
FIG. 1 is a flow chart illustrating one example of a process performed by a valve positioning system.

FIG. 1 illustrates an example of a process 100 performed by a valve positioning system. The valve positioning system may individually monitor components of the valve positioning system (operation 110). For example, monitoring the components of the valve positioning system may include monitoring input and output signals for one or more components (e.g., current to pressure transducer and/or relay). In particular implementations, input and output signals for each component may be monitored. The valve positioning system may determine the condition of each component being monitored (operation 120). By determining the condition of a component of a valve positioning system, problems or failure of a component may be more accurately predicted. For example, problems or failure of a component may be isolated to a single component (e.g., gas supply) rather than attributed to the entire valve positioning system. Furthermore, an error in a valve positioning system may be attributed to the appropriate component (e.g., a leak in a gas supply connection to an electric-to-pressure output converter rather than attributing the error to a component that is functioning properly (e.g., an electric-to-pressure output converter)).

In some implementations, components may be continuously and/or periodically monitored, which may result in more accurate valve operation and/or greater predictability of failure of components of the valve positioning system. Components may be monitored at least once every 24 hours, in some implementations. Trending analysis, input/output curves, etc. may be performed to facilitate prediction of failure or problems with components.

In some implementations, an input signal to one or more of the components may be modified. For example, the input signal may be interrupted, a high frequency signal may be sent, and/or the input signal may be modified for a time period too short for the mechanical components of the fluid control system and/or the valve to react. The input and output signals to one or more of the components of the fluid control system may then be monitored and the condition of the monitored components may be determined. Modifying the input signal to a component may facilitate identification and/or isolation of a problem in the fluid control system.

Figure 2:
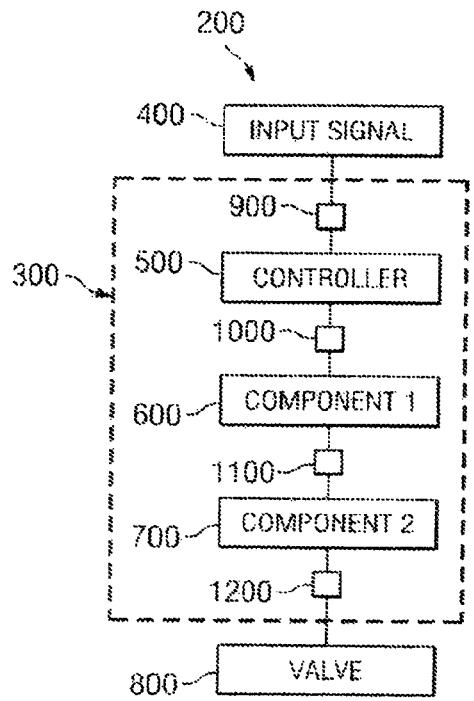
FIG. 2 is a block diagram illustrating an example of a fluid control system.

FIG. 2 illustrates one example of a fluid control system 200. Fluid control system 200 includes a valve positioning system 300. Valve positioning system 300 may include a controller 500 and at least two components 600, 700. Sensors 900, 1000, 1100, 1200 may be coupled to inlets and/or outlets of components to determine signals transmitted and/or received by the components.

During use, an input signal 400 (e.g., a 4-20 mA signal) may be sent to controller 500. A sensor 900 may measure the signal received by the controller. Controller 500 may transmit a signal to first component 600 (e.g., an electric-to-pressure output converter), which may be measured by a sensor 1000. First component 600 may transmit a signal to second component 700 (e.g., a pneumatic relay or an actuator), which may be measured by a sensor 1100. Second component 700 may transmit a signal to a valve 800. The signal transmitted to valve 800 from second component 700 may adjust the position of the valve. A sensor 1200 may measure the signal transmitted to valve 800. In some implementations, sensor 1200 or another sensor may determine a position of valve 800.

In some implementations, the controller and one or more of the components may be positioned in a housing. The housing may at least partially enclose at least one of the components and the controller. The housing may be weather resistant, explosion resistant and/or proof, and/or meet government and/or industry standards. Positioning the controller and/or components in the housing may facilitate installation of the valve positioning system and/or prevent damage to components and/or controllers.

Figure 3:
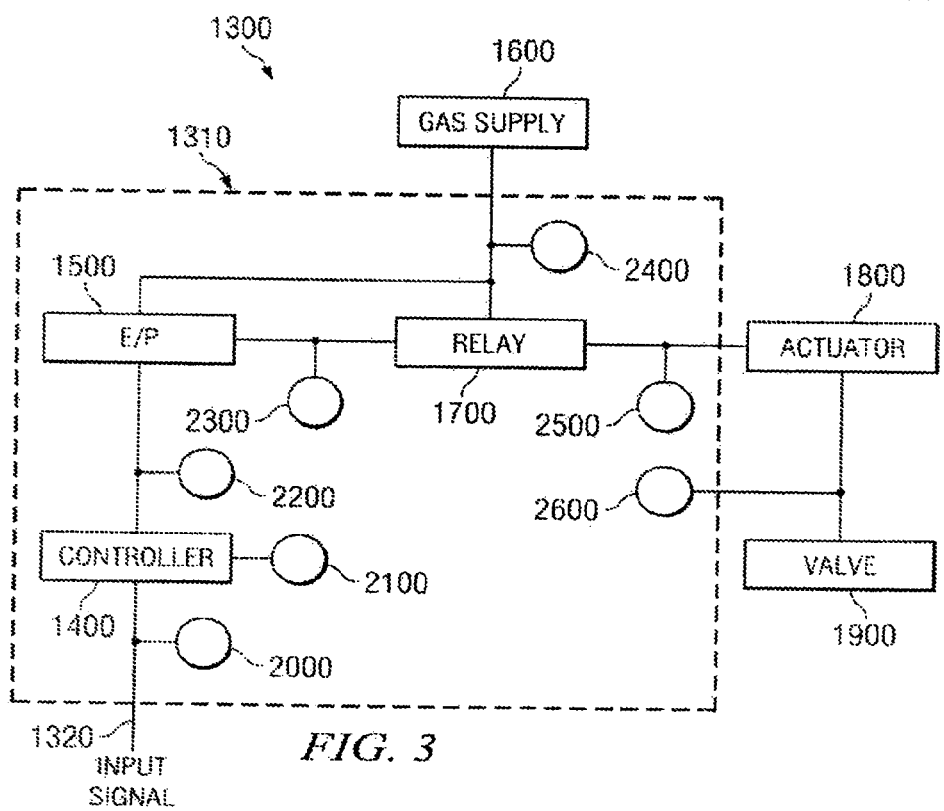
FIG. 3 is a block diagram illustrating another example of a fluid control system.

FIG. 3 illustrates another example of a fluid control system 1300. The fluid control system includes a valve positioning system 1310, an actuator 1800, and a valve 1900. Valve positioning system 1310 may be coupled to a gas supply 1600 and/or actuator 1800. Valve positioning system 1310 includes a controller 1400 and an electric-to-pressure converter 1500 and a relay 1700 (e.g., a spool valve or a pneumatic amplifier). In particular implementations, actuator 1800 may be a component of the valve positioning system 1310.

Controller 1400 may be coupled to an electric-to-pressure output converter 1500. Gas supply 1600 (e.g., air or natural gas) may be coupled to and deliver gas to the electric-to-pressure output converter 1500 and/or relay 1700. Relay 1700 may transmit and/or amplify received fluid signals. In the illustrated implementation, valve positioning system 1310 includes a single relay 1700. In other implementations, however, the valve positioning system may include multiple relays. For example, a valve positioning system may include a relay above and below a piston of an actuator (not shown). Relay 1700 may be coupled to actuator 1800. Actuator 1800 may be coupled to valve 1900 and adjust a position of the valve.

Valve positioning system 1310 also includes sensors coupled to inlets and outlets of the components. The sensors may be positioned proximate a component being monitored. In some implementations, a sensor at an inlet of one of the components may be analogous to a sensor at an outlet of another component (e.g., an input signal of one component may be the same as an output signal of another component). A sensor 2000 may monitor a input signal 1320 received by controller 1400. The sensor 2100 may measure a temperature proximate controller 1400. Ambient temperatures greater than a predetermined temperature may cause one or more components to deteriorate. A sensor 2200 may monitor a signal transmitted from controller 1400 to electric-to-pressure converter 1500. A sensor 2300 may monitor a signal transmitted from electric-to-pressure converter 1500 to relay 1700. A sensor 2400 may be coupled to the gas supply to measure (e.g., flow rate, amount, or pressure) the gas stream transmitted from the gas supply to electric-to-pressure output converter 1500 and/or relay 1700. A sensor 2500 may measure a signal transmitted from relay 1700 to actuator 1800. A sensor 2600 may measure a position of valve 1900.

The controller may receive signals representing measured parameters from the sensors. In some implementations, the signals may be stored. The controller may include a processor and a memory. A processor may be any programmable logic device, such as a microprocessor, a microcontroller, or a field programmable gate array (FPGA). A memory may include a computer system memory such as DRAM, SRAM, EDO RAM, RDRAM, etc., or a non-volatile memory such as a magnetic media (e.g., a hard drive), optical storage, or EEPROM. The memory of the controller may store data such as signals from sensors and/or conditions of components.

The processor of the controller may include instructions to individually monitor components and determine a condition of each of the components. Received signals and/or inputs from operators may be stored in the memory of the controller. The controller may analyze the signals received from components of the fluid control system and/or compare the signals received to previous signals received and stored in the memory of the controller. For example, trending analysis may be performed on the received signals. In particular implementations, stored signals may be used to determined input/output curves for analysis of a component condition.

In some implementations, the controller may transmit a message in response to monitoring the signals. For example, a message may be transmitted to an operator that identifies the condition of a component of the valve (e.g., impending failure of a component).

Figure 4:
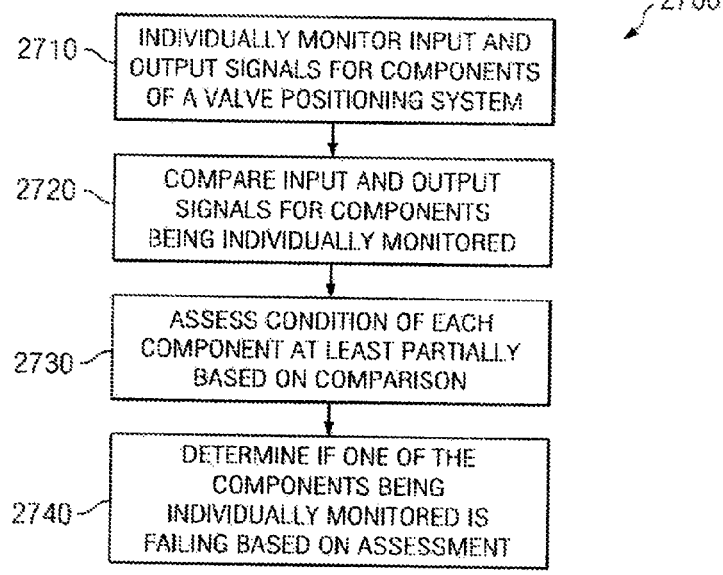
FIG. 4 is a flow chart illustrating a process performed by a valve positioning system.

FIG. 4 illustrates an example of a process 2700 performed by a valve positioning system. Process 2700 may, for example, illustrate the operation of valve positioning system 1510 in FIG. 3. Components of the valve positioning system may be individually monitored based on their input and output signals (operation 2710). For example, a controller of a valve positioning system may receive and analyze signals from sensors coupled to components of the valve positioning system monitored during normal operations.

Individually monitoring components of the valve and/or valve positioning system during normal operations may allow problems in components of a valve to be detected prior to the problems occurring. Normal operations may include when the fluid control system is operating in steady state, stable, or when nothing appears to be wrong in the fluid control system, as opposed to a malfunctioning fluid control system (e.g., limit cycles).

Signals from the inlet and the outlet of each monitored component may be compared (operation 2720). The relationship between the inlet and the outlet of a component may be known and/or predictable. Thus, signals at the inlet and the outlet may be monitored, and the condition of the component may be determined. For example, signals at an inlet and an outlet of an electric-to-pressure converter and/or an actuator may be monitored to determine the condition of each component. The signals from input and outlet of a component may be compared using a variety of tests, such as, but not limited to, comparing input/output curves, f-test, Fourier transforms, or wavelet analysis. In some implementations, a theoretical output signal is determined from the measured input signal. The measured output signal may be compared to the theoretical output signal.

In particular implementations, the signals from the inlet and the outlet of each monitored component may be compared to data stored in a memory of a controller and/or a remote memory. Comparison of the signals to data stored in a memory may be used to determine a condition of a component. For example, input and output signals for a component that deviate more than a predetermined amount from stored data that includes historical signals for input and output signals may indicate that the component will fail and/or a problem will occur with the component.

The condition of each component being monitored may be determined based at least partially on the comparison(s) (operation 2730). For example, a problem such as a leak in an electric-to-pressure output converter may be determined based on a comparison of input and output signals to the electric-to-pressure output converter (e.g., a signal transmitted from the controller to the electric-to-pressure output converter, a measurement of a gas stream transmitted from the gas supply to the electric-to-pressure output converter, and the output signal from the electric-to-pressure output converter). The valve positioning system may determine if one of the components being individually monitored is failing based at least partially on the determination of the condition of the component (operation 2740). For example, properties of a component prior to failure may be known and the valve position system may monitor components for these known properties. The valve positioning system may determine if a component will fail prior to failure and/or determine if a problem will occur in a component prior to the problem occurring.

Using process 100 and/or 2700, for example, a valve positioning system may determine component conditions such as, but not limited to, plugging of electric-to-pressure output converters, deposits on electric-to-pressure output converter flexures or nozzles, failure of controller electronics, performance shift of controller electronics, failure or leak in a relay (e.g., failure or leak in a diaphragm of a relay), gas leaks in tubing connections (e.g., to an actuator, a relay, or an electric-to-pressure output converter), broken actuator springs, increased packing friction, low pressure gas stream delivery from gas supply, and/or temperature outside a predetermined range (high temperatures may cause failure in a few days). For example, if the measured output signal is not within a predetermined range of the theoretical output signal, the condition of the component may have deteriorated. In some implementations, a valve positioning system may determine if a component is exhibiting behavior associated with failure. In other implementations, a valve positioning system may determine if a component of the valve is broken (e.g., a connection is leaking or loose, a converter is not making the appropriate conversion, an actuator is sticking, etc.).

Figure 5:
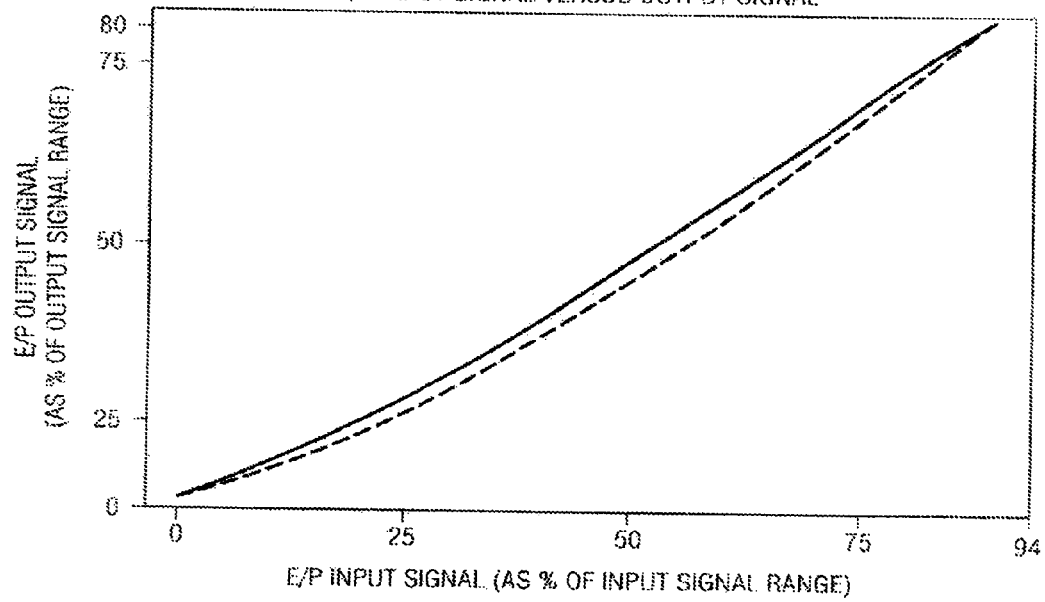
FIG. 5 illustrates a representation of an input/output curve for an electric-to-pressure output converter.
Figure 6:
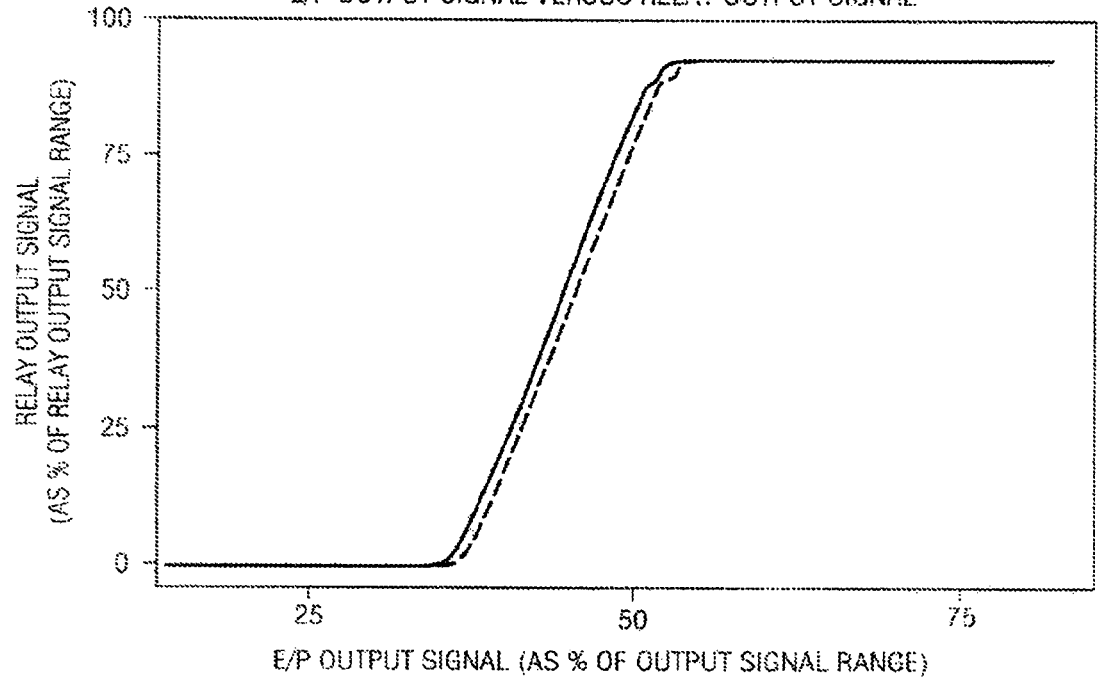
FIG. 6 illustrates a representation of an input/output curve for a relay.
Figure 7:
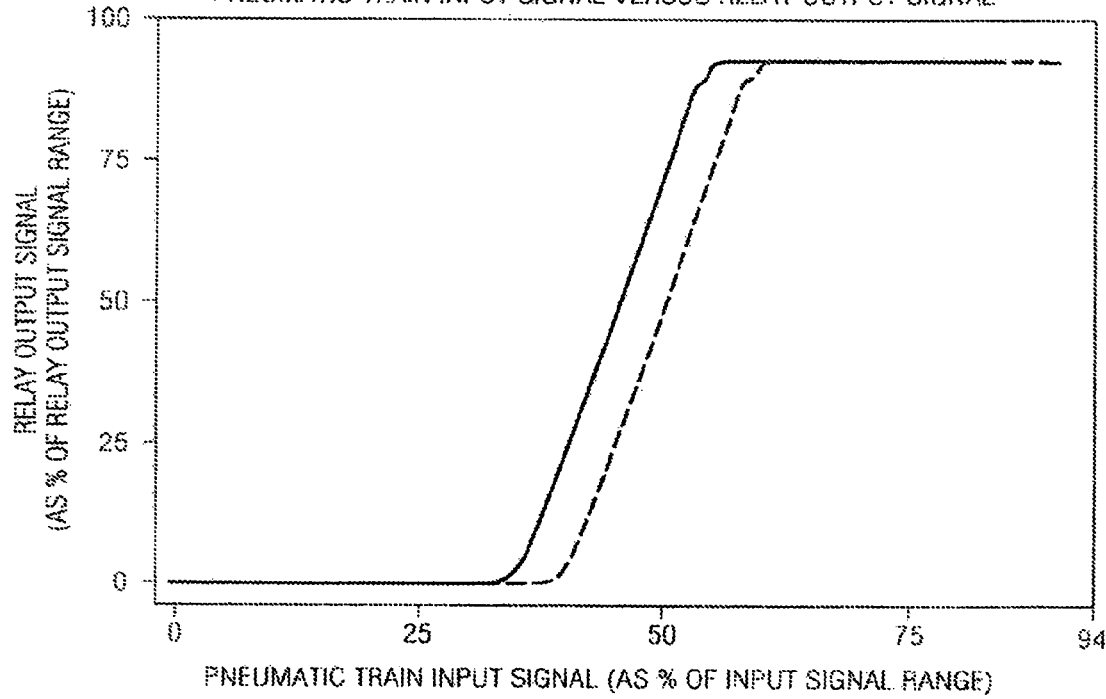
FIG. 7 illustrates a representation of an input/output curve for a measured pneumatic train input signal and a relay output signal.

FIGS. 5-7 illustrate example input/outlet signal curves for a normally operating valve positioning system. FIG. 5 illustrates a representation of an input/output curve for an electric-to-pressure output converter. FIG. 6 illustrates a representation of an input/output curve for a relay. In another implementation, FIG. 7 illustrates a representation of an input/output curve for a pneumatic train. The pneumatic train may include an electric-to-pressure converter and a pneumatic relay. Thus, an input to the pneumatic train may be, for example, an input signal to an electric-to-pressure converter, and an output from the pneumatic train may be, for example, a relay output signal. As illustrated in FIG. 7, the pneumatic train appears to be operating normally.

Figure 8:
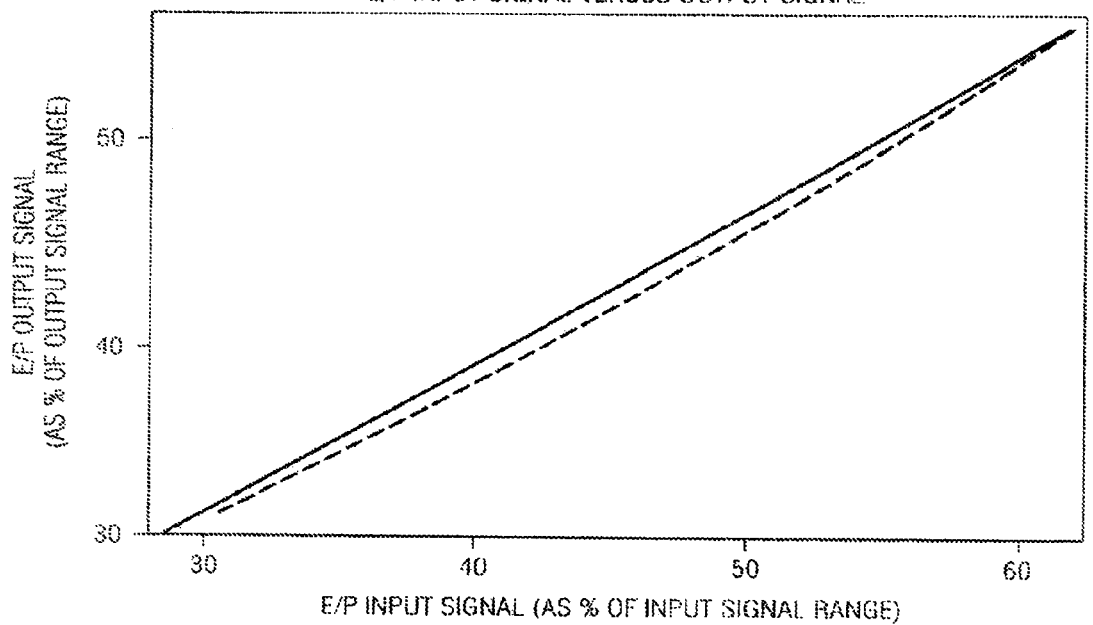
FIG. 8 illustrates a representation of an input/output curve for an electric-to-pressure output converter.
Figure 9:
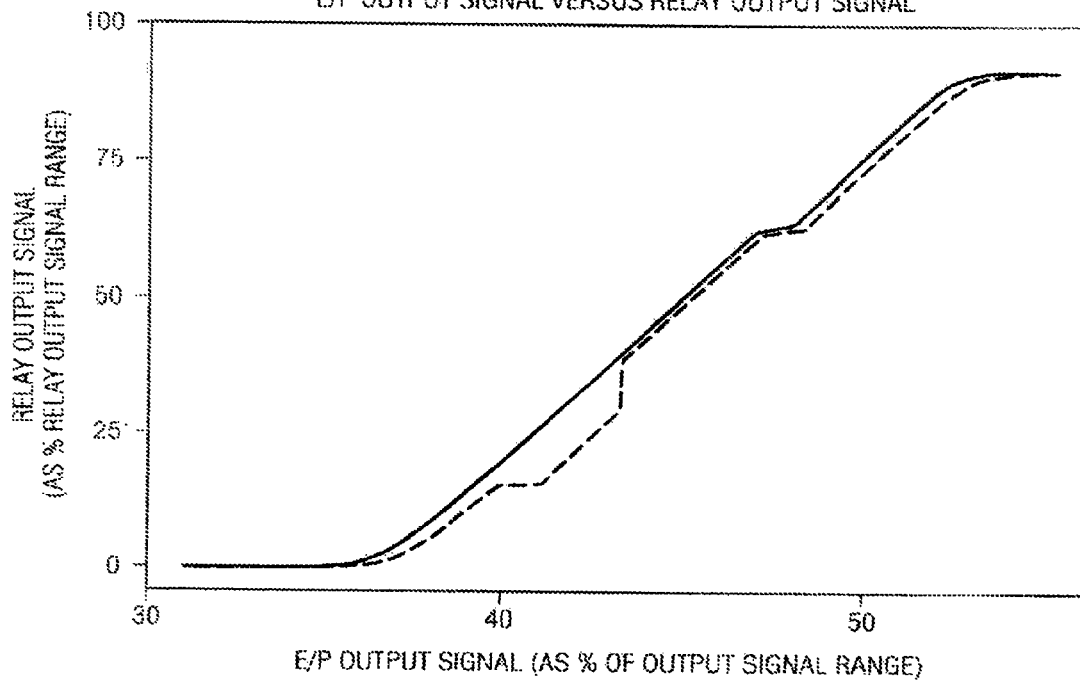
FIG. 9 illustrates a representation of an input/output curve for a relay.
Figure 10:
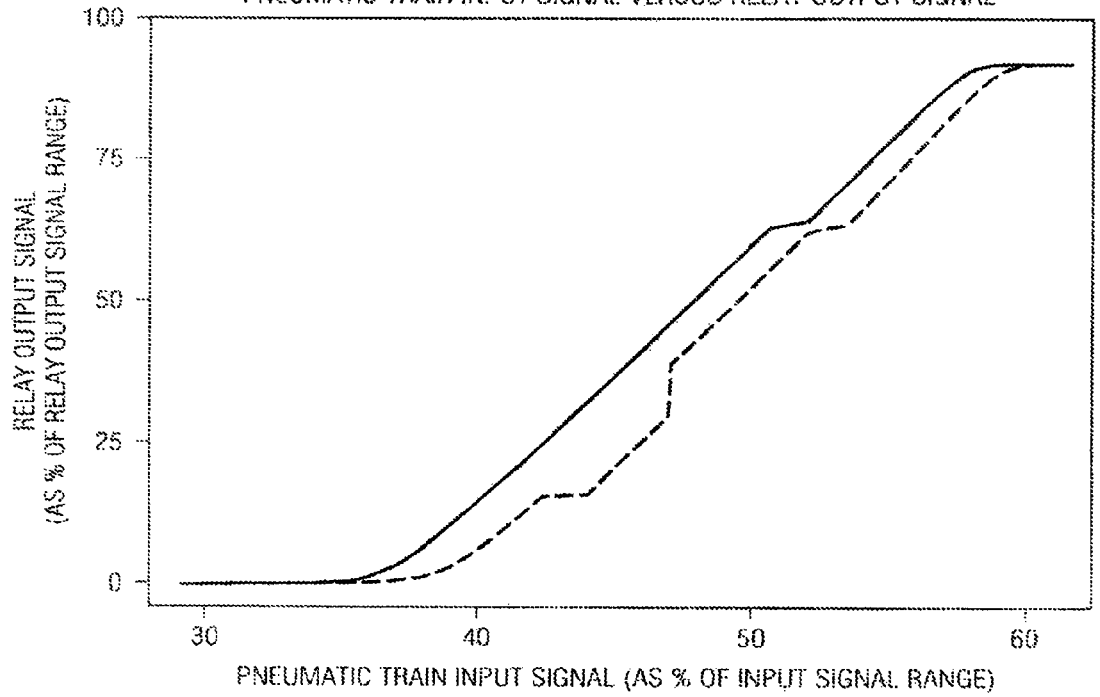
FIG. 10 illustrates a representation of an input/output curve for a measured pneumatic train input signal and a relay output signal.

FIGS. 8-10 illustrate example input/output signal curves for a valve positioning system with a small air leakage in the line feeding the actuator. Since the input/output signal curve for the electric-to-pressure output converter appears to be normal in FIG. 8, but the input/output signal curve for the relay in FIG. 9 includes an output that does not appear to be normal, the condition of the components may be determined. In this illustration, the condition of the electric-to-pressure output converter is normal, but there is a problem or will be a problem in the relay. FIG. 10 illustrates an input/output signal curve for a pneumatic train. The input of the pneumatic train input signal (e.g., current to an electric-to-pressure converter) is graphed versus a relay output signal, which is the output signal from the pneumatic train. As illustrated in FIG. 10, there is a problem or will be a problem within the pneumatic train (e.g., electric-to-pressure converter and pneumatic relay). The input/output curves of the components of the pneumatic train (see, for example, FIGS. 8-9) may be analyzed after a problem in the pneumatic train has been identified to determine where the problem is occurring and/or what the cause might be.

Figure 11:
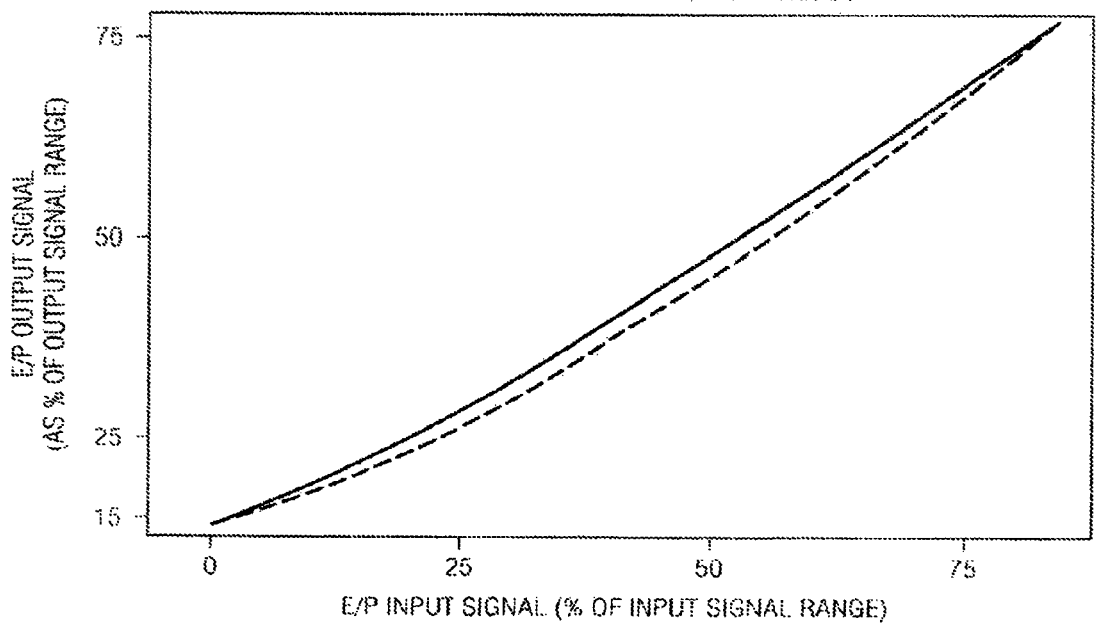
FIG. 11 illustrates a representation of an input/output curve for an electric-to-pressure output converter.
Figure 12:
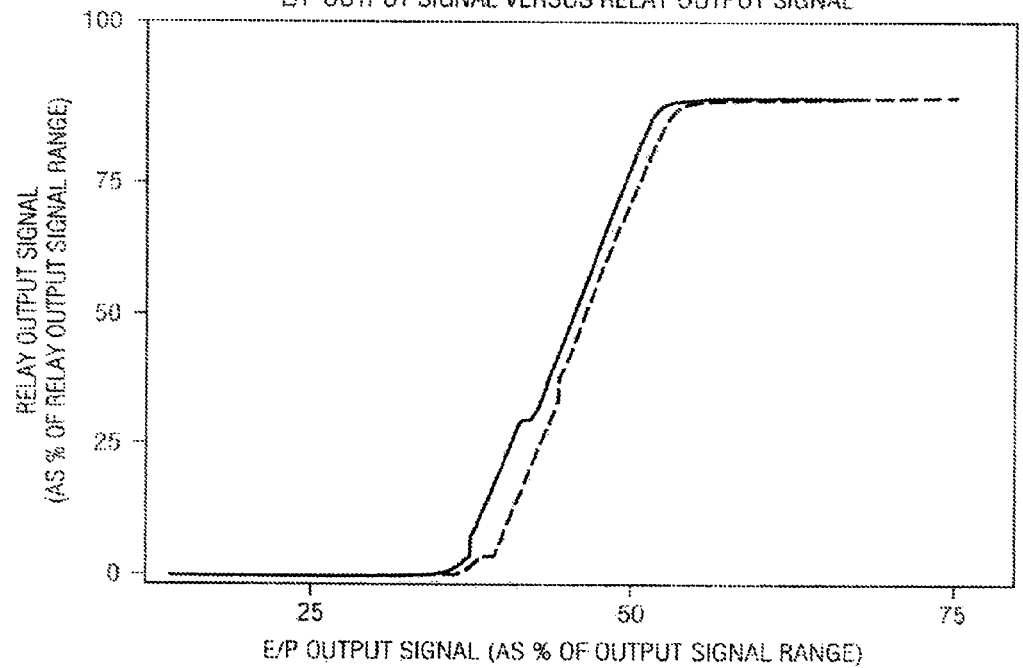
FIG. 12 illustrates a representation of an input/output curve for a relay.
Figure 13:
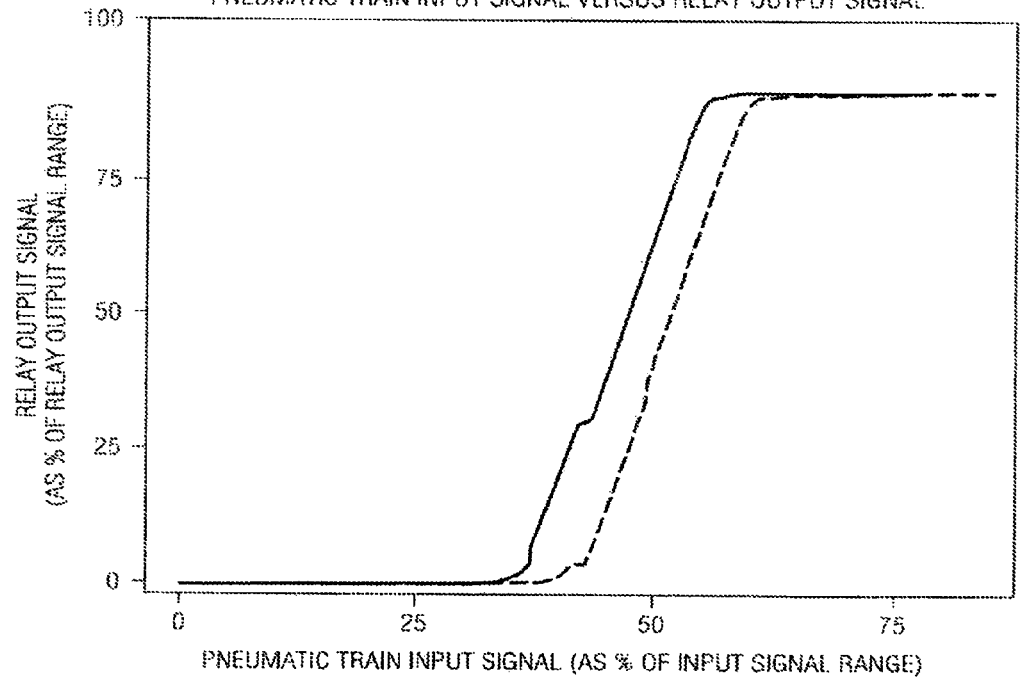
FIG. 13 illustrates a representation of an input/output curve for a measured pneumatic train input signal and a relay output signal.

FIGS. 11-13 illustrate example input/output signal curves for a valve positioning system with a large air leakage. The input/output signal curve for the electric-to-pressure output converter appears to be normal in FIG. 11. However, the input/output signal curves for the relay in FIG. 12 include an output that does not appear to be normal. Thus, the condition of the components may be determined. The condition of the electric-to-pressure output converter is normal in this illustration, but there is a problem or will be a problem in the relay. FIG. 13 illustrates an input/output signal curve for a pneumatic train. The input/output curve is a graph of a measured pneumatic train input signal (e.g., current to an electric-to-pressure converter) versus a relay output pressure, which is the output of the pneumatic train. As illustrated in FIG. 13, there is a problem or will be a problem within the pneumatic train. The input/output curves of the components of the pneumatic train (see, for example, FIGS. 11-12) may be analyzed after a problem within the pneumatic train has been identified to determine where the problem is occurring and/or what the cause might be.

In some implementations, a determination of the condition of a component may be based on input/output signal curves, such as for an actuator or other component comprising a single inlet and a single outlet. Identification and/or isolation of a problem or a failure developing in a component of the valve positioning system may also be facilitated by use of more than one input/output signal curve. For example, determination of a condition of a component may be based on more than one input/output signal curve when a condition of a relay is being determined since a relay may be coupled to a gas supply, an electric-to-pressure output converter, and an actuator.

The systems and processes discussed above may have a variety of features. One feature of a valve positioning system and process may be the ability to determine if a problem or failure will occur in a component of the system prior to the problem or failure occurring. Predicting problems and/or failures may decrease operating costs due to lost productivity when a component fails. Furthermore, identifying and/or isolating a problem to a component of the valve positioning system may reduce down-time for repair and/or replacement of the component.

Another feature of a valve positioning system and process may be on-line monitoring. On-line monitoring may allow a valve positioning system to continue to operate during monitoring. On-line monitoring may reduce operating costs by reducing the amount of redundancy needed in a system (e.g., extra valve positioning systems may not be necessary when a system is capable of on-line monitoring).

In some implementations, a valve positioning system may be used in safety-instrumented systems (e.g., emergency shut-down valves and other systems with high reliability standards). Use of valve positioning systems capable of diagnosing problems and/or failures prior to the problem or failure occurring may meet and facilitate compliance with regulations of safety-instrumented systems.

Particular implementations of valve positioning systems and processes may use an input signal to one of the components to facilitate diagnostics. The input signal may be adjusted such that an actuator for the valve is inhibited from responding (e.g., by adjusting the position of the valve) to the input signal change. For example, an input signal to a component may be terminated or modified for a period of time small enough such that an actuator is inhibited from responding. In some implementations, the input signal may be terminated or modified for a period of less than 10 ms. Since the signal returns to the original signal after termination or modification of the signal for less than 10 ms, the actuator and the valve may be inhibited from responding to the terminated and/or modified signal. As another example, a high frequency input signal may be transmitted such that the actuator is inhibited from responding (e.g., the mechanical components of the actuator may be unable to respond to a high frequency input signal). For example, a high frequency input signal may be above the cutoff frequency for the actuator and below the cutoff frequency for components being monitored. In certain implementations, inhibiting the actuator from responding may result in the actuator not responding.

As a further example, the input signal may be adjusted (e.g., higher or lower) for a predetermined period of time (e.g., for 1 millisecond, 1 microsecond, or any other appropriate period of time) after which the input signal is allowed to return to its previous value. The predetermined period of time and/or adjustment may be small enough that a valve actuator is inhibited from responding. For example, forces such as friction or fluid dampening may inhibit an actuator from responding quickly. Thus, since a signal may be adjusted (higher/lower) for a brief period of time prior to returning to its previous valve, the valve actuator may not move or move insignificantly (e.g., movement of the actuator due to the adjustment of the input signal may not substantially affect the fluid control).

The signals at an inlet and an outlet of component(s) due to the adjusted input signal may be monitored. The condition of a component may be determined based on the comparison of the input signal and the output signal of the component.

Adjusting an input signal may allow components of the valve positioning system to react (e.g., cause signals transmitted from the component(s) to adjust) while not substantially altering the position of the valve. This may allow the condition of components of the positioning system and/or valve to be determined without substantially affecting the position of the valve, and, hence, a regulated process. In some implementations, the input and output signals for one or more of the components may be measured in response to the adjustment of the input signal. The condition of the component may be determined based on the input and output signals for the component. For example, the input and output signals may be compared and the condition of the component may be based at least partially on the comparison. In certain implementations, the input and output signals of most, if not all, of the components of the positioning system and/or valve may be measured and compared.

Figure 14:
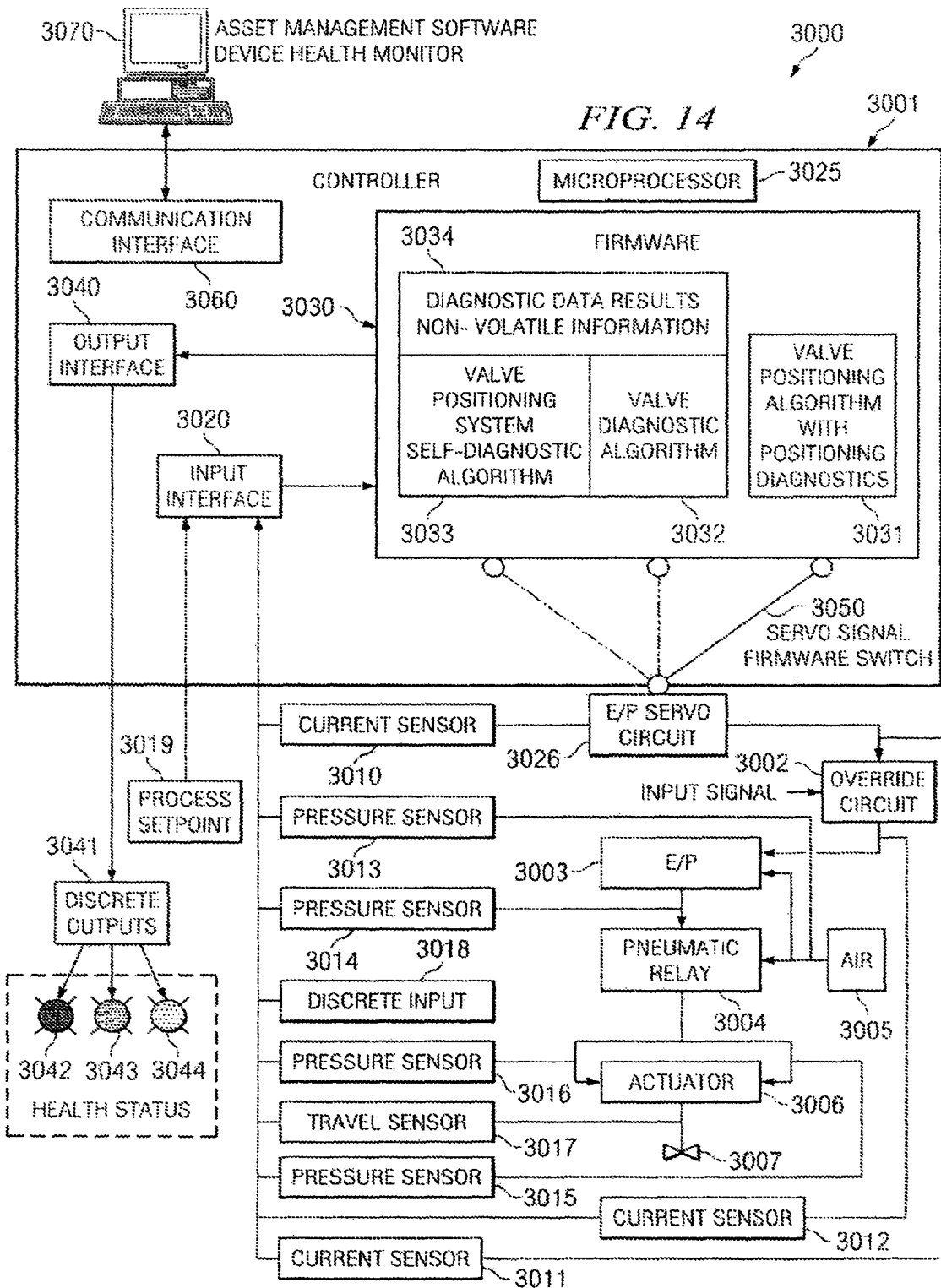
FIG. 14 illustrates a representation of a fluid control system.

FIG. 14 illustrates an example fluid control system 3000. Fluid regulatory system 3000 may also include a controller 3001 and an override circuit 3002. Input signals (e.g., process setpoints, etc.) may be transmitted directly to an input interface 3020 of controller 3001 and/or to override circuit 3002. Controller drives the electric-to-pressure (E/P) servo circuit 3026, which delivers a current command signal to E/P converter 3003.

E/P servo controller 3026 may be any hardware and/or software for generating control signals to E/P converter 3003 in response to commands received from controller 3001. The control signal sent from the E/P servo controller 3026 may be adjusted based on data from sensors (e.g., sensors 3010-3017). For example, the control signal sent from the E/P servo circuit 3026 may be adjusted based on data received from a pressure sensor 3016 coupled to actuator 3006. The control signals are communicated from the E/P servo circuit 3026 to the override circuit 3002, allowing the override circuit 3002 to produce control signals for the electric-to-pressure converter 3003.

Override circuit 3002 may provide safety control features to fluid control system 3000. For example, if unsafe conditions exist in or affect fluid control system 3000, override circuit 3002 may modify or interrupt an input signal (e.g., process setpoint 3019, control signal to E/P converter 3003, etc.) provided to or by the fluid control system to provide a signal that causes the fluid control system to go to a "safe state" (e.g., vent fluids to atmosphere, close valves, or any action appropriate for a specific system). As an example, if a process such as a chemical reaction becomes uncontrollable, the override circuit 3002 may interrupt the signal from controller 3001 to the E/P converter 3003 and cause the fluid control system 3000 to go to a safe state (e.g., closing a feed line to the process). As another example, if a leak of unsafe material is detected, the override circuit 3002 may modify the signal to cause the fluid control system 3000 to close a valve 3007 upstream of the leak.

Input and output signals for the components of fluid control system 3000 may be determined by sensors 3010-3017. A current sensor 3010, for example, may be coupled to E/P servo circuit 3026 to determine a current input signal (e.g., from controller 3001). Current sensors 3011, 3012 may be coupled to an inlet and outlet of override circuit 3002 to determine the current input signal to the override circuit (e.g., from E/P servo circuit 3026) and the current output signal from the override circuit 3002 (e.g., to the E/P 3003). Pressure sensors 3013, 3014, 3015, 3016 may be coupled to the outlet of the E/P converter 3003, outlets of the pneumatic relay 3004, and/or air supply 3005. A sensor 3017 (e.g., travel sensor) may determine the position of the valve 3007.

The data from sensors 3010-3017 are transmitted to input interface 3020 of controller 3001. Additionally, discrete inputs 3018 (e.g., trip signals and other types of signals) and the process setpoint 3019 (e.g., position of valve desired during operation) may be transmitted to input interface 3020. The input interface 3020 may provide the information from sensors 3010-3017 and other inputs to the firmware 3030 executed by a microprocessor 3025 of fluid control system 3000. Data from monitoring and/or results of analysis of the data may be stored in a nonvolatile memory 3034 of the microprocessor 3025.

Override circuit 3002 may be implemented using digital components, analog components, or a combination thereof. Override circuit 3002 may be any collection of electronic components that can interrupt or modify the communication of a signal to E/P converter 3003 without disrupting the ability of the signal to power controller 3001 and/or sensors 3010-3017. Override circuit 3002 may be located apart from controller 3001, such as on a separate printed circuit board, or it may be integrated with the controller.

In some implementations, input signal to override circuit 3002 may be a trip signal. A trip signal and/or a command signal may control operation of override circuit 3002. A trip signal may be regulated by an external control mechanism, which may base determinations on data received from various parts of a regulation process and/or facility. Override circuit 3002 may, for example, be triggered in response to receiving a trip signal (e.g., for testing purposes or to cause a fluid regulatory system to go to a safe state), detecting a change in the state (such as going from high to low) of a command signal such as process setpoint 3019, detecting an interruption in the trip signal or the command signal, receiving notice of an unsafe condition, or any of numerous other events which require operating fluid regulatory system in a safe state. When override circuit 3002 receives a trip signal, the modification performed on the control signal (e.g., from controller 3001 to E/P converter 3003) may be any suitable modification to cause the E/P converter 3003 to perform an action associated with the "safe state" (e.g., transitioning to a default state, such as closed, or freezing the current state). For example, some E/P converters 3003 vent to the atmosphere (e.g., a valve is opened that releases fluids in the fluid regulatory system to the atmosphere) when the control signal is interrupted.

Override circuit 3002, which may be viewed as a safety override circuit in one aspect, may have a variety of configurations. In certain implementations, for example, override circuit 3002 may receive input signals before being provided to controller 3001. Thus, override circuit 3002 may evaluate input signals and determine whether to modify the input signal and/or control signal to E/P converter 3003 while still allowing controller 3001 to extract power and communications from the input signal. Modifying the input signal and/or control signal may include boosting, attenuating, transforming, interrupting, converting, or otherwise manipulating the control signal to produce a particular response from E/P converter 3003. If the input signal does not indicate that a condition is occurring, the control signal output by override circuit 3002 may be essentially the same as one that enters (e.g., control signal from E/P servo circuit). In some implementations, override circuit 3002 may receive a trip signal in addition to or instead of a command signal. Override circuit 3002 may also evaluate a trip signal to determine whether to modify the control signal to E/P converter 3003. If E/P converter 3003 vents to atmosphere during signal modification, override circuit 3002 may restore the output pressure of the E/P converter to atmospheric pressure in response to an activation condition.

To evaluate an input signal for modifying the E/P converter control signal, override circuit 3002 may, for example, include a transistor coupled to the control signal line and controlled by a comparator. The transistor may be any suitable current- or voltage-controlled electronic component that restricts or allows current flow in response to a signal at a control terminal (discussed here as a comparator). For example, the transistor may be p-type or n-type field effect transistor (FET), such as metal oxide semiconductor FET (MOSFET) that is controlled by a voltage applied to a gate terminal of the MOSFET. The comparator may be any circuitry for comparing a reference input signal to a threshold input signal (e.g., an op-amp) and producing an output to control the transistor in response to the comparison.

In one implementation, override circuit 3002 may receive an input current generated from the command signal. A resistor may be coupled to the negative line of the command signal and placed in parallel with a diode to develop a voltage proportional to the command signal's input current. A resistor may also be coupled to the positive line of the command signal to produce a characteristic voltage drop representative of the command signal's input current. A voltage regulator may work with the second resistor to form a constant reference voltage against which the voltage across the first resistor is compared.

In operation, the comparator performs the comparison of the characteristic voltage representative of the input current to the reference voltage. If the characteristic voltage falls out of range (e.g., below the reference voltage), because the input current is too low or because the voltage regulator has shunted the input current to ground because it was too high, the comparator turns off its respective transistor, thus interrupting current flow to the E/P converter. In particular implementations, the circuitry can be redundantly duplicated to provide added security.

To evaluate a trip signal for modifying the control signal, override circuit 3002 may, for example, include a transistor in the positive path of the control signal. The transistor may be any suitable current- or voltage-controlled electronic component that restricts or allows current flow in response to a signal at a control terminal (discussed here as a voltage regulator). The voltage signal used to control the transistor is the trip signal, stepped down by the voltage regulator to a voltage level appropriate for the transistor. Thus, for example, a 24-V trip signal could be stepped down for 5 V if the transistor was a 5-V MOSFET. The override circuit 3002 may also have a resistor coupled between the positive path of the control signal and the gate line of the transistor to prevent current from the stepped-down trip signal from significantly altering the control signal. For example, the resistor may be selected to have a relatively high resistance value, such as 1 MΩ, to minimize current flow.

In operation, the transistor allows current flow as long as the stepped-down voltage from the trip signal is maintained. When the trip signal is interrupted, the current flow through the transistor is interrupted, thus interrupting the control signal to E/P converter 3003. In response to the interruption of the control signals, the E/P converter 3003 transitions to a safe state, such as venting to the atmosphere. Thus, the override circuit 3002 provides an effective operation for stopping the control signal in response to the trip signal. In particular implementations, the override circuit 3002 may include two duplicate override circuits for increased reliability.

In certain implementations, the features of monitoring the command signal and monitoring the trip signal may be provided in one safety override circuit override circuit 3002 (e.g., on the same circuit board). In application, however, it may be that only one of the safety features is used. Furthermore, although mention has been made of the override device having redundancy through duplicate circuits, it may be advantageous to provide redundancy through non-duplicate circuits, which may reduce the chance of both circuits being affected by the same condition. In certain implementations, however, redundancy is not required.

Controller 3001 may include firmware 3030 to facilitate monitoring and/or diagnosis of problems in fluid control system 3000 and/or components of the fluid control system. During operations, a valve positioning algorithm with positioning diagnostics 3031 of firmware 3030 may be utilized by controller 3001 to drive the E/P servo circuit 3026 in response to input signals, monitor components of fluid regulatory system 3000, and/or diagnose the health of the fluid control system and/or various components of the fluid control system. In some implementations, controller 3001 may utilize other modules of firmware 3030 to test the health of various components. For example, the signal to E/P 3003 may be modified (e.g., via E/P servo circuit 3026) using a valve positioning self diagnostic algorithm 3033 and/or valve diagnostic algorithm 3034 to determine the health of components of the fluid control system 3000. Although the firmware 3030 is described in different modules or portions 3031-3033, various portions of the firmware may be combined. For example, the valve positioning algorithm with positioning diagnostics 3031 may be a portion of or combined with valve positioning system self-diagnostic algorithm 3033.

A switch 3050 (e.g., controller or servo signal, software switch, or firmware switch) may allow the controller to drive the E/P servo circuit 3026 using various modules of firmware 3030. Controller may utilize a valve positioning algorithm with positioning diagnostics 3031, valve diagnostic algorithm 3032, and/or valve positioning self-diagnostic algorithm 3033. The data from monitoring components of the fluid control system 3000 (e.g., in response to receiving process setpoint 3019) may be analyzed using the valve positioning algorithm with positioning diagnostics 3031 and valve diagnostic algorithm 3032. Valve positioning algorithm with positioning diagnostics 3031 may diagnose the health of components of the fluid control system 3000. Valve diagnostic algorithm 3032 may diagnose the health of components of the fluid control system 3000. For example, the valve diagnostic algorithm 3032 may modify a control signal to the E/P servo circuit 3026 such that the valve position is adjusted (e.g., by linearly modifying the signal), and the change in valve position may be monitored. The health of the valve and/or actuator may be determined based on the modification to the control signal. The controller 3001 may utilize switch 3050 to execute valve diagnostic algorithm 3032 and/or valve positioning system self-diagnostic algorithm 3033 to test components of fluid control system 3000.

Figure 15:
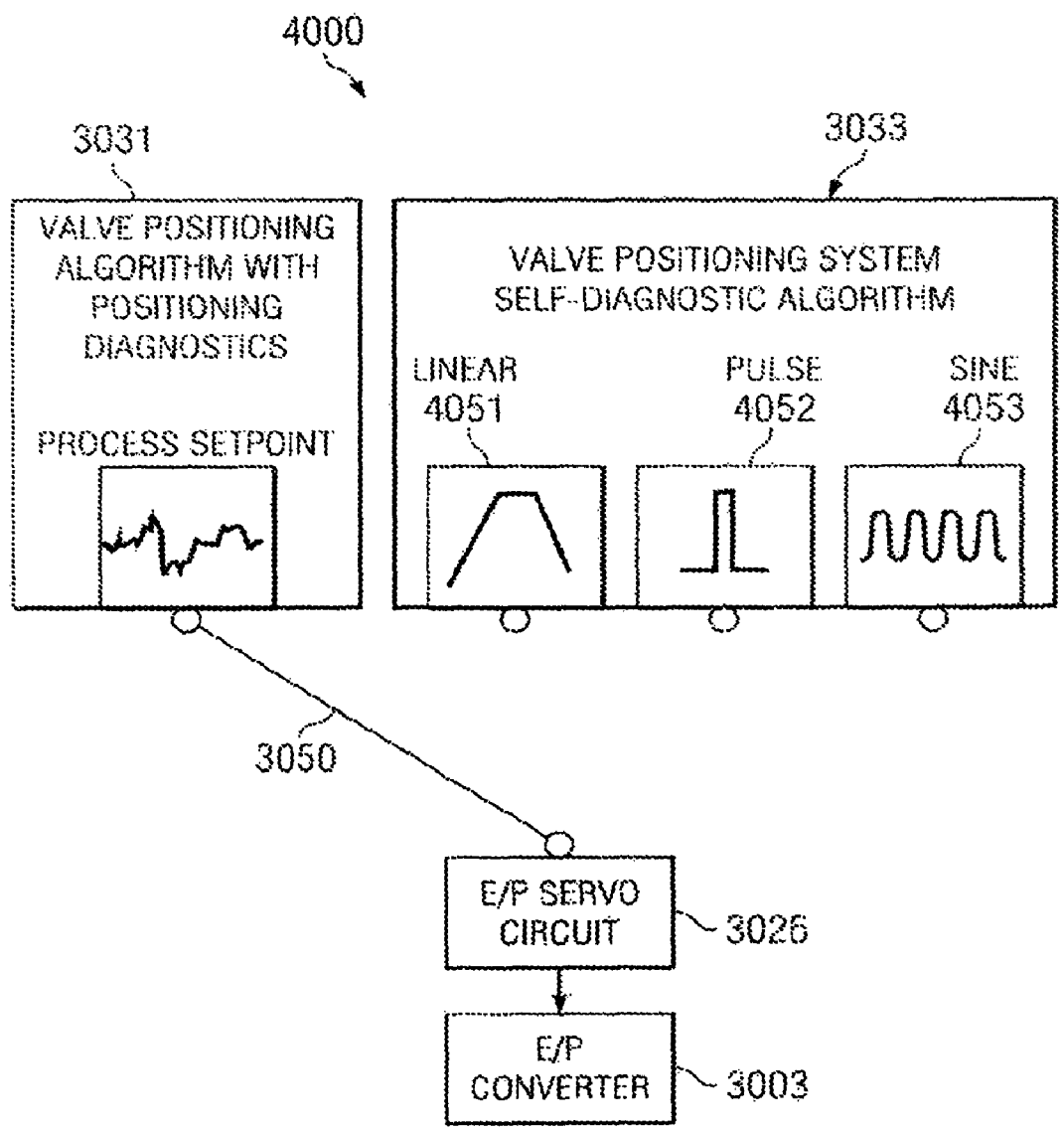
FIG. 15 illustrates a representation of a portion of a fluid control system.

FIG. 15 illustrates an example of a portion 4000 of the fluid control system 3000 illustrated in FIG. 14. The switch 3050 allows controller 3001 utilize various algorithms, as appropriate, to drive E/P servo circuit 3026, which delivers signals to control the E/P converter 3003. For example, during use, valve position may be determined according to a process setpoint. The valve positioning algorithm with positioning diagnostics 3031 may individually monitor components (e.g., E/P servo circuit 3026, override circuit 3002, E/P converter 3003, relay 3004, and/or actuator 3006) while adjusting to a process setpoint specified. The valve positioning algorithm with positioning diagnostics 3031 may analyze data from monitoring components individually. For example, valve positioning algorithm with positioning diagnostics 3031 may determine if the valve has difficulty adjusting to the process setpoint specified. The valve positioning algorithm with positioning diagnostics 3031 may adjust the control signal delivered from the E/P servo circuit 3026 in response to the detected problem. For example, if the valve is having difficulty closing, the current signal delivered from E/P servo circuit 3026 may be adjusted to adjust the pressure signal delivered from the current-to-pressure converter to facilitate closing the valve.

Components of fluid control system 3000 may also be tested by modifying an input signal delivered by the E/P servo circuit 3026. The valve positioning system self-diagnostic algorithm 3033 may be capable of performing various modifications on the control signal delivered by E/P servo circuit 3026 to components of the fluid control system (e.g., override circuit or electric-to-pressure converter). For example, valve positioning system self-diagnostic algorithm 3033 may modify a command signal and/or interject a signal into the command signal such as linear modification 4051, a pulse signal 4052, and/or a sine signal 4053. The type of modification selected to test components may be based on the component on which testing is performed. A linear modification of the signal 4051 may, for example, be used to test the actuator 3006 and/or the valve 3007 health. A signal may be linearly modified and the position of the valve may be adjusted while monitoring the health of the valve, actuator, and/or other components of the fluid control system. As another example, an actuator 3006 may include a spring in compression when the valve is closed. The pressure signal delivered to the actuator 3006 may be linearly increased to increase pressure delivered to a spring of an actuator of the spring (e.g., above the pressure required to cause the spring to close the valve) without changing the position of the valve and the health of components of the valve positioning system (e.g., E/P converter and/or relay) may be determined. Thus, in a fully closed valve, an input signal to components, such as the E/P converter and/or relay, may be modified and the pressure delivered to the actuator may be increased as a result; however, since the pressure required to close the valve is already being delivered to the spring, the position of the valve may not be substantially affected (e.g., a mechanical stop may inhibit the spring from further compressing as more pressure is applied to the spring). Although the above example is described in terms of an air-to-close valve, a similar procedure may be used in air-to-open valves (e.g., when a valve is fully opened, pressure delivered to the valve may be increased without substantially affecting the position of the valve)

As a further example, the signal delivered to the E/P converter 3003 may be linearly saturated and then desaturated to determine the health of the E/P converter and/or override circuit 3002. In addition, the override circuit 3002 may be tested using a pulse signal 4052. Since the short time period of the pulse signal 4052 may inhibit mechanical components of the fluid control system from reacting to the pulse signal, the override circuit 3002 may be tested while inhibiting a change in the valve 3007 position. Thus, the responsiveness of the override circuit 3002 may be tested without substantially affecting normal operations. As another example, a command signal from E/P servo circuit may be modified to include a sine signal 4053 to test electrical components of the fluid control system 3000 (e.g., override circuit 3002 and/or E/P converter 3003) while inhibiting movement of the valve 3007 position. As another example, the valve position may be temporarily modified to determine a valve health and/or the health of other components of the fluid control system 3000.

The output interface 3040 may receive the results of the analysis of the data by valve positioning algorithm with positioning diagnostics 3031 or other modules of the firmware 3030 and send a signal to discrete outputs 3041. Discrete outputs 3041 may include outputs that display the health of one or more of the components of the fluid control system 3000 and/or the overall health of the fluid control system. For example, a red LED 3042 may indicate if a problem that requires immediate attention (e.g., from an operator) exists with fluid control system 3000. A yellow LED 3043 may indicate if a problem may exist with fluid control system 3000 (e.g., valve 3007 is sticking or air is leaking from the air supply 3005). A green LED 3044 may indicate if a fluid control system 3000 is in general good health (e.g., few or no problems in the fluid control system).

In some implementations, asset management device 3070 may include software that facilitates monitoring fluid control system health. Asset management device 3070 may include a computer (e.g., in control room, on a personal digital assistant, on a smart phone, etc.) coupled to (e.g., via one or more network protocols or directly) the fluid control system 3000. A communication interface 3060 of the microprocessor 3025 of controller 3001 may transmit data from monitoring components of the fluid control system 3000 to the asset management software for analysis. Asset management software may analyze the data using any of the tests previously described or any other test to facilitate determining if a problem exists with a component of the fluid control system 3000. As an example, asset management software 3000 may determine the health of individual fluid control system components periodically.

The asset management device may include a graphical user interface that facilitates identification of problems and/or the health of components of the fluid control system. For example, the graphical user interface may include a representative schematic of the fluid control system and an indicator that indicates the health of the component. As another example, a graphical user interface of asset management device may allow a user, such as an operator, to view tests and/or results of tests on individual components of the fluid control system.

Several implementations for achieving fluid control system diagnostics have been described, and a number of others have been mentioned or suggested. Furthermore, those skilled in the art will readily recognize that a variety of modifications, substitutions, deletions, and/or additions may be made to these implementations while still achieving fluid control system diagnostics. The scope of the protected subject matter therefore is to be determined on the basis of the following claims, which may encompass one or more aspects of one or more of the implementations.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a relay" includes a combination of two or more relays and reference to "a gas" includes mixtures of different types of gases.

What is claimed is:

1. A valve positioning system comprising:
at least two or more components, wherein at least one of the components comprises an electric-to-pressure output converter; and
a controller configured to:
adjust a position of a valve by sending a command signal to the electric-to-pressure output converter;
individually monitor at least two of the components of the valve positioning system by determining an input signal to and an output signal from each of the at least two monitored components; and
determine a condition for each of the at least two components being individually monitored at least partially by comparing the respective input and output signals from each of the at least two monitored components.

2. The system of claim 1, further comprising an actuator, and wherein the controller is further configured to individually monitor the actuator and determine the condition of the actuator.

3. The system of claim 1, wherein the controller is further configured to determine a condition of a third component based on the monitoring of the at least two components, where the third component is not a monitored component.

4. The system of claim 1, wherein the controller is configured to determine if a particular one of the at least two monitored components will fail prior to the particular component failing or is failing when determining a condition of the particular component being individually monitored.

5. The system of claim 1, wherein the controller is configured to determine if there will be a problem with a particular one of the at least two monitored components prior to the problem occurring when determining a condition of a component being individually monitored.

6. The system of claim 1, further comprising a housing at least partially enclosing at least two of the components and the controller.

7. The system of claim 1, further comprising sensors coupled to an inlet associated with the input signal and an outlet associated with the output signal of at least one of the components being individually monitored, wherein the sensors are configured to transmit the input and the output signals of the component to the controller.

8. The system of claim 1, wherein at least one of the components comprises a relay.

9. The system of claim 1, wherein an input signal for at least one of the components comprises an output signal of another component.

10. The system of claim 1, wherein the controller is further configured to:
adjust an input signal to at least one component of the valve positioning system such that a valve actuator is inhibited from responding to the input signal change;
wherein individually monitoring at least two of the components comprises determining input and output signals for each of the at least one of the monitored components based on the adjusted input signal; and
wherein a condition of one of the components being individually monitored is determined at least partially based on a comparison of the input signal and the output signal of the monitored component.

11. A method performed by a valve positioning system, the method comprising:
individually monitoring at least two components of a valve positioning system, wherein one of the components comprises an electric-to-pressure output converter, by determining an input signal to and an output signal from each of the at least two monitored components; and
determining a condition for each of at least two components being individually monitored at least partially by comparing the respective input and output signals from each of the at least two monitored components.

12. The method of claim 11, wherein determining a condition of a third component is based on the individual monitoring of the at least two components, where the third component is not a monitored component.

13. The method of claim 11, further comprising determining if a particular one of the at least two monitored components will fail prior to the particular component failing or is failing at least partially based on the determination of the condition of the particular component.

14. The method of claim 11, further comprising determining if a problem will occur prior to the problem occurring in a particular one of the at least two monitored components at least partially based on the determination of the condition of the particular component.

15. The method of claim 11, further comprising:
adjusting an input signal to at least one component of the valve positioning system such that a valve actuator is inhibited from responding to the input signal change;
wherein individually monitoring each of the at least two of the components comprises determining input and output signals for at least one of the components based on the adjusted input signal; and
wherein a condition of a particular one of the at least two components being individually monitored is determined at least partially based on a comparison of the input signal and the output signal of the particular component.

16. A method performed by a valve positioning system comprising:
adjusting an input signal to at least one component of a valve positioning system such that a valve actuator is inhibited from responding to the input signal change; and
determining a condition of at least one of the components at least partially based on the adjusted input signal.

17. The method of claim 16, wherein adjusting the input signal comprises terminating the input signal.

18. The method of claim 16, wherein adjusting the input signal comprises transmitting a high frequency signal.

19. The method of claim 18, wherein transmitting a high frequency signal comprises transmitting a signal that is above the cutoff frequency of the actuator and below the cutoff frequency of the positioner components.

20. The method of claim 16, further comprising determining if one of the components will fail prior to failure or is failing at least partially based on the determination of the condition of the component.

21. The method of claim 16, further comprising determining if a problem will occur prior to the problem occurring in one of the components at least partially based on the determination of the condition of the component.

22. The method of claim 16, wherein determining a condition of at least one of the components at least partially based on the adjusted input signal comprises:
   determining input and output signals for at least one of the components based on the adjusted input signal; and
   determining a condition of at least one of the components at least partially based on a comparison of the determined input signal and the determined output signal of the component.

* * * * *

UNITED STATES PATENT AND TRADEMARK OFFICE
CERTIFICATE OF CORRECTION

| | |
|---|---|
| PATENT NO. | : 7,890,216 B2 |
| APPLICATION NO. | : 12/437443 |
| DATED | : February 15, 2011 |
| INVENTOR(S) | : Henry W. Boger |

It is certified that error appears in the above-identified patent and that said Letters Patent is hereby corrected as shown below:

Page 1, 2nd Column, U.S. Patent Documents, add -- 4,027,554 6/1977 Ito et al. --.

Page 2, 1st Column, U.S. Patent Documents, add -- 4,369,401 1/1983 Fayfield et al. --.

Page 2, 1st Column, U.S. Patent Documents, add -- 6,131,609 10/2000 Metso et al. --.

Page 2, 2nd Column, U.S. Patent Documents, add -- 7,178,330 2/2007 Kouzu et al. --.

Page 2, 2nd Column, U.S. Patent Documents, add -- 7,480,487 1/2009 Smart et al. --.

Page 2, 2nd Column, U.S. Patent Documents, add -- 2006/0260702 11/2006 Levesque et al. --.

Page 2, 2nd Column, U.S. Patent Documents, add -- 2006/0265105 11/2006 Hughes --.

Page 2, 2nd Column, U.S. Patent Documents, add -- 2006/0273776 12/2006 Smart et al. --.

Page 2, 2nd Column, U.S. Patent Documents, add -- 2007/0183901 8/2007 Chester et al. --.

Page 3, Column 2, Other Publications, delete "Nofification" and insert -- Notification -- therefor.

Column 13, line 29, after "valve" insert -- . --.

Signed and Sealed this
Third Day of May, 2011

David J. Kappos
*Director of the United States Patent and Trademark Office*